United States Patent
Xu et al.

(10) Patent No.: US 12,325,895 B2
(45) Date of Patent: Jun. 10, 2025

(54) METHOD FOR DYNAMICALLY CONTROLLING HIGH-PRESSURE LEACHING REACTION CONDITION OF LATERITE NICKEL ORE

(71) Applicants: PT QMB NEW ENERGY MATERIALS, Dki Jakarta (ID); PT ESG NEW ENERGY MATERIAL, Dki Jakarta (ID); GEM CO., LTD., Guangdong (CN); PT GEM INDONESIA NEW ENERGY MATERIALS, Dki Jakarta (ID)

(72) Inventors: Kaihua Xu, Guangdong (CN); Satryo Soemantri Brodjonegoro, Dki Jakarta (ID); Yi Wang, Dki Jakarta (ID); Rizky Wanaldi, Dki Jakarta (ID); Tegar Mukti Aji, Dki Jakarta (ID); Evan Wahyu Kristiyanto, Dki Jakarta (ID); Andi Syaputra Hasibuan, Dki Jakarta (ID); Piyan Rahmadi, Dki Jakarta (ID)

(73) Assignees: PT QMB NEW ENERGY MATERIALS, Jakarta Selatan (ID); PT ESG NEW ENERGY MATERIAL, Jakarta Selatan (ID); GEM CO., LTD., Shenzhen (CN); PT GEM INDONESIA NEW ENERGY MATERIALS, Jakarta Selatan (ID)

( * ) Notice: Subject to any disclaimer, the term of this patent is extended or adjusted under 35 U.S.C. 154(b) by 0 days.

(21) Appl. No.: 18/870,449

(22) PCT Filed: Jun. 30, 2023

(86) PCT No.: PCT/CN2023/105018
§ 371 (c)(1),
(2) Date: Nov. 29, 2024

(87) PCT Pub. No.: WO2025/000488
PCT Pub. Date: Jan. 2, 2025

(65) Prior Publication Data
US 2025/0115977 A1 Apr. 10, 2025

(51) Int. Cl.
*C22B 3/00* (2006.01)

(52) U.S. Cl.
CPC .................. *C22B 23/0415* (2013.01)

(58) Field of Classification Search
CPC ............................ C22B 23/04–0492
USPC ....................................... 423/150.1
See application file for complete search history.

(56) References Cited

U.S. PATENT DOCUMENTS

| 4,195,065 A | 3/1980 | Duyvesteyn |
| 2015/0044112 A1* | 2/2015 | Matsubara ................ C22B 3/02 423/1 |

FOREIGN PATENT DOCUMENTS

| AU | 2009203045 A1 * | 2/2010 | ............. C01G 53/11 |
| CN | 101768665 A | 7/2010 | |

(Continued)

OTHER PUBLICATIONS

English translation of CN-105143477-A Description. (Year: 2015).*
(Continued)

*Primary Examiner* — Anthony J Zimmer
*Assistant Examiner* — Zachary John Baum

(57) ABSTRACT

A method for dynamically controlling high-pressure leaching reaction condition of laterite nickel ore includes: setting a target temperature and a target pressure of an high-pressure reactor; obtaining the heat power required for heating the feeding pulp to the target temperature; obtaining the heat power brought by the acid; obtaining the required new steam thermal power; obtaining the required new steam flow; adjusting the real-time flow of the new steam to the required flow of the new steam, and adjusting the exhaust valve opening degree and discharge flow rate of the high-pressure (Continued)

reactor to make the real-time pressure of the high-pressure reactor equal to the target pressure, and adjusting the flow rate of the new steam to make the real-time temperature of the high-pressure reactor equal to the target temperature.

11 Claims, 2 Drawing Sheets

(56) References Cited

FOREIGN PATENT DOCUMENTS

| | | | | |
|---|---|---|---|---|
| CN | 101899567 A | | 12/2010 | |
| CN | 105143477 A | * | 12/2015 | ........... C22B 23/005 |
| CN | 111004916 A | | 4/2020 | |
| CN | 112280976 A | * | 1/2021 | ............. C01B 21/40 |
| CN | 114507780 A | | 5/2022 | |
| EP | 2837701 B1 | * | 3/2018 | ............... B03B 7/00 |
| JP | 2022124672 A | | 8/2022 | |
| WO | WO-2015097342 A1 | * | 7/2015 | ........... B01D 21/009 |

OTHER PUBLICATIONS

English translation of CN-112280976-A Description. (Year: 2021).*
International Search Report issued in corresponding International application No. PCT/CN2023/105018, mailed Sep. 27, 2023.
Written Opinion of the International Search Authority in corresponding International application No. PCT/CN2023/105018, mailed Sep. 27, 2023.

* cited by examiner

METHOD FOR DYNAMICALLY CONTROLLING HIGH-PRESSURE LEACHING REACTION CONDITION OF LATERITE NICKEL ORE

FIELD OF THE DISCLOSURE

The present disclosure relates to the technical field of high-pressure leaching of laterite nickel ore, and in particular, to a method for dynamically controlling a high-pressure leaching reaction condition of laterite nickel ore.

BACKGROUND

In a high-pressure acid leaching process of laterite nickel ore, an acid leaching is performed between ore pulp and strong acid solution in a high-pressure reactor at a high temperature and a high pressure. Selectively leaching of nickel and cobalt is implemented under a high-temperature and strong acid condition. Most of impurity iron and aluminum are existed in slag, thereby ensuring a recovery of valuable metal, and reducing material consumption. A recovery rate of metals such as nickel, cobalt, etc., can reach 90% or more.

In the acid leaching process of the laterite nickel ore, to ensure a leaching efficiency, the temperature in the high-pressure reactor needs to be maintained at about 255° C., and the pressure in the high-pressure reactor needs to be maintained at about 4.7 Mpa. However, because the temperature and pressure in the high-pressure reactor are jointly affected by multiple complex factors, in actual production, the temperature and pressure in the high-pressure reactor fluctuate in a large range, and it is difficult to maintain the temperature and pressure in the high-pressure reactor at a best temperature and pressure condition, which results in a relatively low leaching efficiency of the laterite nickel ore.

SUMMARY

The purpose of this disclosure is to provide a method for dynamically controlling high-pressure leaching reaction condition of laterite nickel ore to solve the problem.

To achieve the foregoing purpose, the present disclosure provides a method for dynamically controlling high-pressure leaching reaction condition of laterite nickel ore, including:

setting a target temperature and a target pressure of a high-pressure reactor;

according to the target temperature of the high-pressure reactor and operating parameters of feeding pulp, obtaining a heat power required for heating the feeding pulp to the target temperature;

according to a composition of metal elements and a pulp concentration of the feeding pulp, determining an average mass flow rate of acid intake, and according to the average mass flow rate of the acid intake, obtaining a heat power brought by the acid intake;

obtaining a heat loss correction power, and according to the heat power required for heating the feeding pulp to the target temperature, the heat power brought by the acid intake, and the heat loss correction power, obtaining a required heat power of a new steam;

obtaining operation parameters of the new steam, and according to the required heat power of the new steam and the operation parameters of the new steam, obtaining a required flow rate of the new steam;

adjusting a real-time flow rate of the new steam to the required flow rate of the new steam, after a first preset time, obtaining a real-time pressure of the high-pressure reactor, and according to the real-time pressure of the high-pressure reactor and the target pressure, adjusting an exhaust valve opening degree and a discharge flow rate of the high-pressure reactor to make the real-time pressure of the high-pressure reactor equal to the target pressure; and after the second preset time, obtaining a real-time temperature of the high-pressure reactor, and according to the real-time temperature of the high-pressure reactor and the target temperature, adjusting the flow rate of the new steam to make the real-time temperature of the high-pressure reactor equal to the target temperature.

In some embodiments, the operation parameters of the feeding pulp comprise an average mass flow rate of the feeding pulp, a specific heat capacity of the feeding pulp, and a real-time temperature of the feeding pulp.

In some embodiments, according to the target temperature of the high-pressure reactor and operating parameters of feeding pulp, obtaining a heat power required for heating the feeding pulp to the target temperature, is based on the formula as follows:

$$\dot{Q}_1 = \dot{m}_1 c_{p_1} \Delta T_1$$
$$\Delta T_1 = T - T_1,$$

wherein $\dot{Q}_1$ represents the heat power required for heating the feeding pulp to the target temperature, $\dot{m}_1$ represents the average mass flow rate of the feeding pulp, $c_{p_1}$ represents the specific heat capacity of the feeding pulp, T represents the target temperature of the feeding pulp, and $T_1$ represents the real-time temperature of the feeding pulp.

In some embodiments, according to a composition of metal elements and a pulp concentration of the feeding pulp, determining an average mass flow rate of acid intake, comprises:

obtaining a unit acid consumption of each metal element component of the feeding pulp;

according to the metal element composition and the pulp concentration of the feeding pulp and the unit acid consumption of each metal element component of the feeding pulp, obtaining a total acid consumption of the feeding pulp; and according to the total acid consumption of the feeding pulp, determining an average mass flow rate of the acid intake.

In some embodiments, according to the average mass flow rate of the acid intake, obtaining a heat power brought by the acid intake, is based on the formula as follows:

$$\dot{Q}_3 = \dot{m}_3 \Delta H^0 / M_3$$

wherein, $\dot{Q}_3$ represents the heat power brought by the acid intake, $\dot{m}_3$ represents the average mass flow rate of the acid, $\Delta H^0$ represents an enthalpy of sulfuric acid, and $M_3$ represents a molar mass of the sulfuric acid.

In some embodiments, a method for obtaining a heat loss correction power comprises:

determining the heat loss correction power by using a shape, a size, and a thermal insulation capability of the high-pressure reactor.

In some embodiments, according to the heat power required for heating the feeding pulp to the target temperature, the heat power brought by the acid intake, and the heat loss correction power, obtaining a required heat power of a new steam, is based on the formula as follows:

$$\dot{Q}_2 + \dot{Q}_3 = \dot{Q}_1 + \dot{Q}_r,$$

wherein $\dot{Q}_2$ represents the required heat power of the new steam, $\dot{Q}_3$ represents the heat power brought by the acid intake, $\dot{Q}_1$ represents the heat power required for heating the feeding pulp to the target temperature, and $\dot{Q}_r$ represents the heat loss correction power.

In some embodiments, the operation parameters of the new steam comprise a specific heat capacity of the new steam and a temperature of the new steam.

In some embodiments, according to the required heat power of the new steam and the operation parameters of the new steam, obtaining a required flow rate of the new steam, is based on the formula as follows:

$$\dot{Q}_2 = \dot{m}_2 c_{p_2} \Delta T_2$$
$$\Delta T_2 = T_2 - T$$

wherein $\dot{Q}_2$ represents the required heat power of the new steam, $\dot{m}_2$ represents the required flow rate of the new steam, $c_{p_2}$ represents the specific heat capacity of the new steam, $T_2$ represents the temperature of the new steam, and T represents the target temperature of the high-pressure reactor.

In some embodiments, according to the real-time pressure of the high-pressure reactor and the target pressure, adjusting an exhaust valve opening degree and a discharge flow rate of the high-pressure reactor to make the real-time pressure of the high-pressure reactor equal to the target pressure, comprises:

if the real-time pressure of the high-pressure reactor is less than the target pressure, reducing the exhaust valve opening degree of the high-pressure reactor and the discharge flow rate; and if the real-time pressure of the high-pressure reactor is greater than the target pressure, increasing the exhaust valve opening degree of the high-pressure reactor and the discharge flow rate.

In some embodiments, according to the real-time temperature of the high-pressure reactor and the target temperature, adjusting the flow rate of the new steam to make the real-time temperature of the high-pressure reactor equal to the target temperature, comprises:

if the real-time temperature of the high-pressure reactor is less than the target temperature, increasing the flow rate of the new steam; and if the real-time temperature of the high-pressure reactor is greater than the target temperature, reducing the flow rate of the new steam.

Compared with existing technologies, the beneficial effect of this disclosure is: firstly by the target temperature and the target pressure of the high-pressure reactor, the operating parameters of the feeding pulp, the composition of metal elements and the pulp concentration of the feeding pulp, and the heat loss correction power, the required heat power of the new steam is obtained, according to the required heat power of the new steam, obtain the required flow rate of the new steam, and adjusting the real-time flow rate of the new steam to the required flow rate of the new steam. In this process, the reaction condition of the high-pressure leaching reaction is initially determined according to a feed condition, and then the exhaust valve opening degree, the discharge flow rate, and the flow rate of the new steam are adjusted according to the obtained real-time temperature and pressure of the high-pressure reactor to make the real-time temperature and pressure in the high-pressure reactor equal to the target temperature and pressure. In this process, according the real-time temperature and pressure of the high-pressure reactor, the reaction conditions are adjusted. Through the cooperation of the above-mentioned two control modes, the temperature and pressure of the high-pressure reactor can be maintained under a best temperature and pressure condition, thereby improving a leaching efficiency of laterite nickel ore.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The following describes a preferred embodiment of the present disclosure in detail with reference to the accompanying drawings, where the accompanying drawings constitute a part of the cost application, and together with the embodiments of the present disclosure are used to explain the principles of the present disclosure, and are not intended to limit the scope of the present disclosure.

Figure 1:
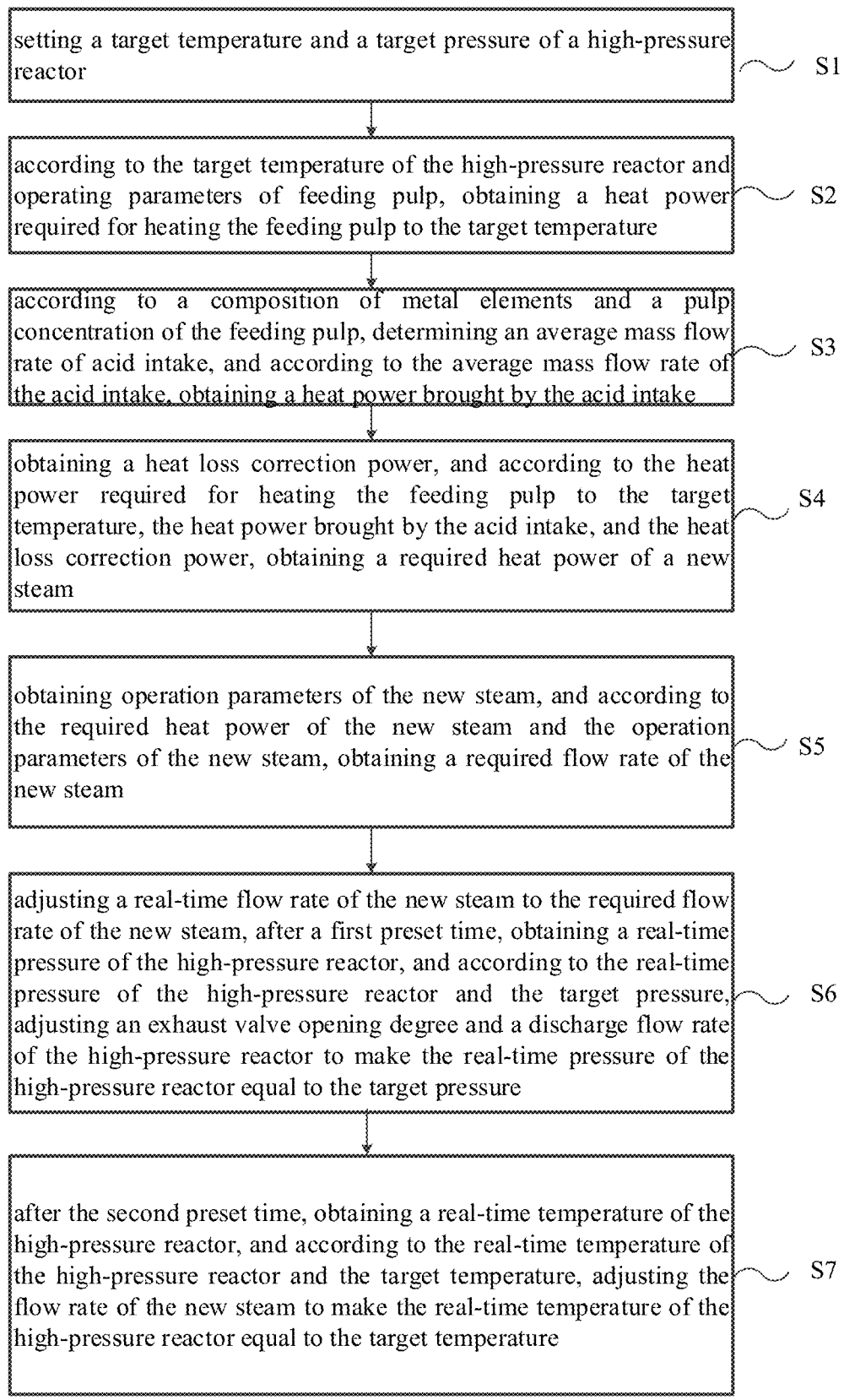
FIG. 1 is a flowchart of a method for dynamically controlling high-pressure leaching reaction condition of laterite nickel ore, according to an embodiment of the present disclosure.

Referring to FIG. 1, a method for dynamically controlling high-pressure leaching reaction condition of laterite nickel ore, includes:

S1, setting a target temperature and a target pressure of a high-pressure reactor.

In this embodiment, the target temperature in the high-pressure reactor is 255° C., and the target pressure in the high-pressure reactor is 4.7 Mpa.

S2, according to the target temperature of the high-pressure reactor and operating parameters of feeding pulp, obtaining a heat power required for heating the feeding pulp to the target temperature, wherein, the operation parameters of the feeding pulp include an average mass flow rate of the feeding pulp, a specific heat capacity of the feeding pulp, and a real-time temperature of the feeding pulp.

A specific formula for calculating the heat power required for heating the feeding pulp to the target temperature is as follows:

$$\dot{Q}_1 = \dot{m}_1 c_{p_1} \Delta T_1$$
$$\Delta T_1 = T - T_1$$

wherein $\dot{Q}_1$ represents the heat power required for heating the feeding pulp to the target temperature, $\dot{m}_1$ represents the average mass flow rate of the feeding pulp, $c_{p_1}$ represents the specific heat capacity of the feeding pulp, T represents the target temperature of the feeding pulp, and $T_1$ represents the real-time temperature of the feeding pulp.

S3, according to a composition of metal elements and a pulp concentration of the feeding pulp, determining an average mass flow rate of acid intake, and according to the average mass flow rate of the acid intake, obtaining a heat power brought by the acid intake.

Figure 2:
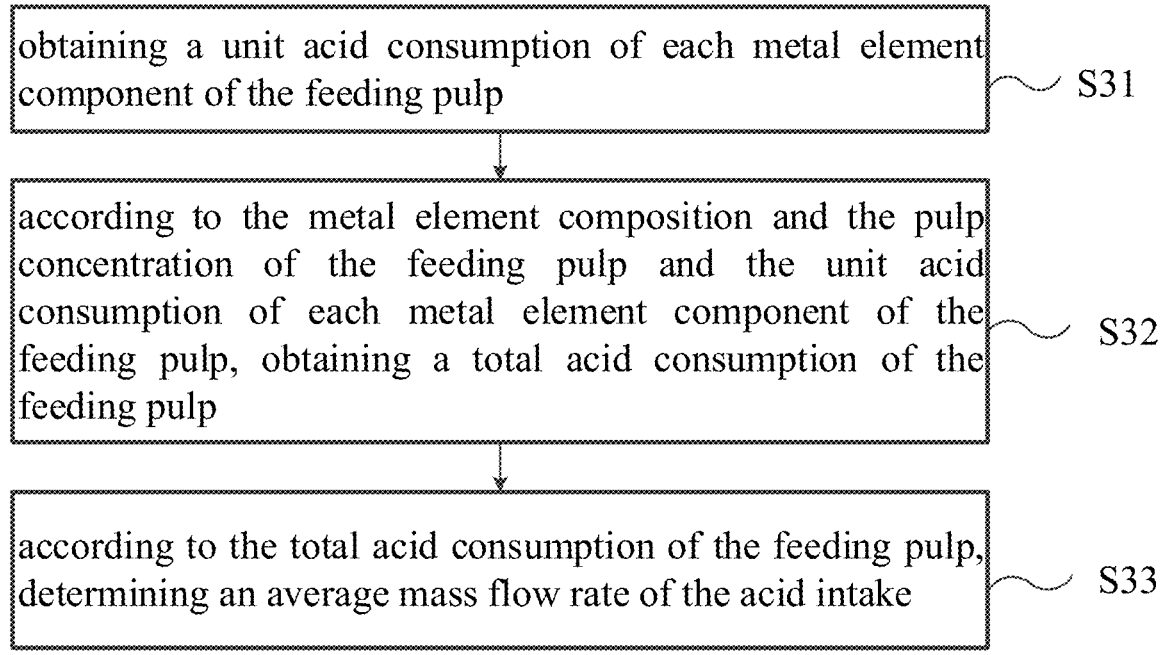
FIG. 2 is a flowchart of a method for determining an average mass flow rate of acid intake of step S3 shown in FIG. 1, according to an embodiment of the present disclosure.

Referring to FIG. 2, according to a composition of metal elements and a pulp concentration of the feeding pulp, determining an average mass flow rate of acid intake, includes:

S31, obtaining a unit acid consumption of each metal element component of the feeding pulp. For the laterite nickel ore, metal element components of the feeding pulp thereof generally include nickel (Ni), cobalt (Co), manganese (Mn), iron (Fe), aluminum (Al), chromium (Cr), magnesium (Mg), and calcium (Ca). A unit acid consumption of these metal elements can be obtained by means of query in a related literature.

S32, according to the metal element composition and the pulp concentration of the feeding pulp and the unit acid consumption of each metal element component of the feeding pulp, obtaining a total acid consumption of the feeding pulp; and S33, according to the total acid consumption of the feeding pulp, determining an average mass flow rate of the feed acid.

wherein, obtaining a heat power brought by the acid intake is based on the formula as follows:

$$\dot{Q}_3 = \dot{m}_3 \Delta H^0 / M_3$$

wherein, $\dot{Q}_3$ represents the heat power brought by the acid intake, $\dot{m}_3$ represents the average mass flow rate of the acid, $\Delta H^0$ represents an enthalpy of sulfuric acid, and $M_3$ represents a molar mass of the sulfuric acid.

S4. obtaining a heat loss correction power, and according to the heat power required for heating the feeding pulp to the target temperature, the heat power brought by the acid intake, and the heat loss correction power, obtaining a required heat power of a new steam.

The method for obtaining the heat loss correction power includes determining the heat loss correction power by using a shape, a size, and a thermal insulation capability of the high-pressure reactor, or obtaining the heat loss correction power of the high-pressure reactor by using device detection data provided by a manufacturer of the high-pressure reactor, or pushing back the heat loss correction power of the high-pressure reactor by using production data in an actual operating process.

Wherein, according to the heat power required for heating the feeding pulp to the target temperature, the heat power brought by the acid intake, and the heat loss correction power, obtaining a required heat power of a new steam is based on the formula as follows:

$$\dot{Q}_2 + \dot{Q}_3 = \dot{Q}_1 + \dot{Q}_r$$

wherein $\dot{Q}_2$ represents the required heat power of a new steam, $\dot{Q}_3$ represents the heat power brought by the acid intake, $\dot{Q}_1$ represents the heat power required for heating the feeding pulp to the target temperature, and $\dot{Q}_r$ represents the heat loss correction power.

S5. obtaining operation parameters of the new steam, and according to the required heat power of the new steam and the operation parameters of the new steam, obtaining a required flow rate of the new steam. Wherein, the operation parameters of the new steam comprise a specific heat capacity of the new steam and a temperature of the new steam.

According to the required heat power of the new steam and the operation parameters of the new steam, obtaining a required flow rate of the new steam, is based on the formula as follows:

$$\dot{Q}_2 = \dot{m}_2 c_{p_2} \Delta T_2$$
$$\Delta T_2 = T_2 - T$$

wherein $\dot{Q}_2$ represents the required heat power of the new steam, $\dot{m}_2$ represents the required flow rate of the new steam, $c_{p_2}$ represents the specific heat capacity of the new steam, $T_2$ represents the temperature of the new steam, and T represents the target temperature of the high-pressure reactor.

S6, adjusting a real-time flow of the new steam to the required flow of the new steam, after a first preset time, obtaining a real-time pressure of the high-pressure reactor, and according to the real-time pressure of the high-pressure reactor and the target pressure, adjusting an exhaust valve opening degree and a discharge flow rate of the high-pressure reactor to make the real-time pressure of the high-pressure reactor equal to the target pressure. In this embodiment, the first preset time is 60 s.

The control logic is as follows:

If the real-time pressure of the high-pressure reactor is less than the target pressure, reducing the exhaust valve opening degree of the high-pressure reactor and the discharge flow rate.

If the real-time pressure of the high-pressure reactor is greater than the target pressure, increasing the exhaust valve opening degree of the high-pressure reactor is increased and the discharge flow rate.

S7. after the second preset time, obtaining a real-time temperature of the high-pressure reactor, and according to the real-time temperature of the high-pressure reactor and the target temperature, adjusting the flow rate of the new steam to make the real-time temperature of the high-pressure reactor equal to the target temperature. In this embodiment, the second preset time is 0.1 s.

The control logic is as follows:

if the real-time temperature of the high-pressure reactor is less than the target temperature, increasing the flow rate of the new steam; and if the real-time temperature of the high-pressure reactor is greater than the target temperature, reducing the flow rate of the new steam.

In a reaction process, a preset time (e.g., 90 s) is used as a cycle, in a front period (e.g., the first 60 s) of the preset time, a reaction condition of an high-pressure reactor reaction is adjusted by using steps S1 to S5, and in a rear period (e.g., the last 30 s) of the preset time, the real-time temperature and the real-time pressure in the high-pressure reactor are adjusted to be equal to the target temperature and the target pressure by using steps S6 and S7. In this way, a stable reaction effect and high-efficiency production are implemented by means of repetition.

To facilitate understanding of the technical solutions provided in the present disclosure, Table 1 shows related parameters involved in the present disclosure.

TABLE 1

High-pressure leaching reaction conditions of laterite nickel ore

| Parameter name | Feeding pulp | New steam | Acid | Reactor |
| --- | --- | --- | --- | --- |
| Temperature | $T_1$ | $T_2$ | $T_3$ | $T$ |
| Pressure | $P_1$ | $P_1$ | $P_1$ | $P$ |
| Average mass flow rate | $\dot{m}_1$ | $\dot{m}_2$ | $\dot{m}_3$ | |
| Specific heat capacity | $c_{p_1}$ | $c_{p_2}$ | | |
| Average heat transfer/ heat absorption rate | $\dot{Q}_1$ | $\dot{Q}_2$ | $\dot{Q}_3$ | |

It should be understood that, although steps in the flowchart of FIG. 1 are sequentially displayed according to an instruction of an arrow, these steps are not necessarily sequentially performed according to an instruction of an arrow. Unless expressly stated in this specification, these steps are not performed in a strict order, and these steps may be performed in another order.

According to the technical solution provided in the present disclosure, the target temperature and the target pressure of the high-pressure reactor, the operating parameters of the feeding pulp, the composition of metal elements and the pulp concentration of the feeding pulp, and the heat loss correction power are firstly used to obtain the required heat power of the new steam, according to the required heat power of the new steam, obtain the required flow rate of the new steam, and adjusting the real-time flow rate of the new steam to the required flow rate of the new steam. In this process, the reaction condition of the high-pressure leaching reaction is initially determined according to a feed condition, and then the exhaust valve opening degree, the discharge flow rate, and the flow rate of the new steam are adjusted according to the obtained real-time temperature and pressure of the high-pressure reactor to make the real-time temperature and pressure in the high-pressure reactor equal to the target temperature and pressure. In this process, according the real-time temperature and pressure of the high-pressure reactor, the reaction conditions are adjusted. Through the cooperation of the above-mentioned two control modes, the temperature and pressure of the high-pressure reactor can be maintained under a best temperature and pressure condition, thereby improving a leaching efficiency of laterite nickel ore.

The foregoing descriptions are merely preferred specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A method for dynamically controlling high-pressure leaching reaction condition of laterite nickel ore, comprising:

setting a target temperature and a target pressure of a high-pressure reactor;

according to the target temperature of the high-pressure reactor and operating parameters of feeding pulp, obtaining a heat power required for heating the feeding pulp to the target temperature;

according to a composition of metal elements and a pulp concentration of the feeding pulp, determining an average mass flow rate of acid intake, and according to the average mass flow rate of the acid intake, obtaining a heat power brought by the acid intake;

obtaining a heat loss correction power, and according to the heat power required for heating the feeding pulp to the target temperature, the heat power brought by the acid intake, and the heat loss correction power, obtaining a required heat power of a new steam;

obtaining operation parameters of the new steam, and according to the required heat power of the new steam and the operation parameters of the new steam, obtaining a required flow rate of the new steam;

adjusting a real-time flow rate of the new steam to the required flow rate of the new steam, after a first preset time, obtaining a real-time pressure of the high-pressure reactor, and according to the real-time pressure of the high-pressure reactor and the target pressure, adjusting an exhaust valve opening degree and a discharge flow rate of the high-pressure reactor to make the real-time pressure of the high-pressure reactor equal to the target pressure; and after the second preset time, obtaining a real-time temperature of the high-pressure reactor, and according to the real-time temperature of the high-pressure reactor and the target temperature, adjusting the flow rate of the new steam to make the real-time temperature of the high-pressure reactor equal to the target temperature.

2. The method for dynamically controlling the high-pressure leaching reaction condition of laterite nickel ore according to claim 1, wherein the operation parameters of the feeding pulp comprise an average mass flow rate of the feeding pulp, a specific heat capacity of the feeding pulp, and a real-time temperature of the feeding pulp.

3. The method for dynamically controlling the high-pressure leaching reaction condition of laterite nickel ore according to claim 2, wherein according to the target temperature of the high-pressure reactor and operating parameters of feeding pulp, obtaining a heat power required for heating the feeding pulp to the target temperature, is based on a formula as follows:

$$\dot{Q}_1 = \dot{m}_1 c_{p_1} \Delta T_1$$

$$\Delta T_1 = T - T_1,$$

wherein $\dot{Q}_1$ represents the heat power required for heating the feeding pulp to the target temperature, $\dot{m}_1$ represents the average mass flow rate of the feeding pulp, $c_{p_1}$ represents the specific heat capacity of the feeding pulp, T represents the target temperature of the feeding pulp, and $T_1$ represents the real-time temperature of the feeding pulp.

4. The method for dynamically controlling high-pressure leaching reaction condition of laterite nickel ore according to claim 1, wherein according to a composition of metal elements and a pulp concentration of the feeding pulp, determining an average mass flow rate of acid intake, comprises:
   obtaining a unit acid consumption of each metal element component of the feeding pulp;
   according to the metal element composition and the pulp concentration of the feeding pulp and the unit acid consumption of each metal element component of the feeding pulp, obtaining a total acid consumption of the feeding pulp; and
   according to the total acid consumption of the feeding pulp, determining an average mass flow rate of the acid intake.

5. The method for dynamically controlling high-pressure leaching reaction condition of laterite nickel ore according to claim 1, wherein according to the average mass flow rate of the acid intake, obtaining a heat power brought by the acid intake, is based on a formula as follows:

$$\dot{Q}_3 = \dot{m}_3 \Delta H^0 / M_3$$

wherein, $\dot{Q}_3$ represents the heat power brought by the acid intake, $\dot{m}_3$ represents the average mass flow rate of the acid, $\Delta H^0$ represents an enthalpy of sulfuric acid, and $M_3$ represents a molar mass of the sulfuric acid.

6. The method for dynamically controlling the high-pressure leaching reaction condition of laterite nickel ore according to claim 1, wherein a method for obtaining a heat loss correction power comprises:
   determining the heat loss correction power by using a shape, a size, and a thermal insulation capability of the high-pressure reactor.

7. The method for dynamically controlling high-pressure leaching reaction condition of laterite nickel ore according to claim 1, wherein according to the heat power required for heating the feeding pulp to the target temperature, the heat power brought by the acid intake, and the heat loss correction power, obtaining a required heat power of a new steam, is based on a formula as follows:

$$\dot{Q}_2 + \dot{Q}_3 = \dot{Q}_1 + \dot{Q}_r,$$

wherein $\dot{Q}_2$ represents the required heat power of the new steam, $\dot{Q}_3$ represents the heat power brought by the acid intake, $\dot{Q}_1$ represents the heat power required for heating the feeding pulp to the target temperature, and $\dot{Q}_r$ represents the heat loss correction power.

8. The method for dynamically controlling high-pressure leaching reaction condition of laterite nickel ore according to claim 1, wherein the operation parameters of the new steam comprise a specific heat capacity of the new steam and a temperature of the new steam.

9. The method for dynamically controlling high-pressure leaching reaction condition of laterite nickel ore according to claim 8, wherein according to the required heat power of the new steam and the operation parameters of the new steam, obtaining a required flow rate of the new steam, is based on a formula as follows:

$$\dot{Q}_2 = \dot{m}_2 c_{p_2} \Delta T_2$$

$$\Delta T_2 = T_2 - T$$

wherein $\dot{Q}_2$ represents the required heat power of the new steam, $\dot{m}_2$ represents the required flow rate of the new steam, $c_{p_2}$ represents the specific heat capacity of the new steam, $T_2$ represents the temperature of the new steam, and T represents the target temperature of the high-pressure reactor.

10. The method for dynamically controlling the high-pressure leaching reaction condition of laterite nickel ore according to claim 1, wherein according to the real-time pressure of the high-pressure reactor and the target pressure, adjusting an exhaust valve opening degree and a discharge flow rate of the high-pressure reactor to make the real-time pressure of the high-pressure reactor equal to the target pressure, comprises:
   if the real-time pressure of the high-pressure reactor is less than the target pressure, reducing the exhaust valve opening degree of the high-pressure reactor and the discharge flow rate; and
   if the real-time pressure of the high-pressure reactor is greater than the target pressure, increasing the exhaust valve opening degree of the high-pressure reactor and the discharge flow rate.

11. The method for dynamically controlling the high-pressure leaching reaction condition of laterite nickel ore according to claim 1, wherein according to the real-time temperature of the high-pressure reactor and the target temperature, adjusting the flow rate of the new steam to make the real-time temperature of the high-pressure reactor equal to the target temperature, comprises:
   if the real-time temperature of the high-pressure reactor is less than the target temperature, increasing the flow rate of the new steam; and
   if the real-time temperature of the high-pressure reactor is greater than the target temperature, reducing the flow rate of the new steam.

\* \* \* \* \*